(No Model.)

G. HAYES.
WHEEL FOR BICYCLES.

No. 572,892. Patented Dec. 8, 1896.

Witnesses
Arthur Hayes
R. H. Reille

Inventor
Geo. Hayes.

UNITED STATES PATENT OFFICE.

GEORGE HAYES, OF NEW YORK, N. Y.

WHEEL FOR BICYCLES.

SPECIFICATION forming part of Letters Patent No. 572,892, dated December 8, 1896.

Application filed January 31, 1896. Serial No. 577,512. (No model.)

*To all whom it may concern:*

Be it known that I, GEORGE HAYES, a citizen of the United States, and a resident of the city, county, and State of New York, have invented a new and useful Improvement in Wheels for Bicycles and other Vehicles, of which the following is a specification.

My invention relates to wheels for bicycles, unicycles, tricycles, quadricycles, motor-carriages, and wheeled vehicles in general; and the improvement consists in constructing the wheel with a double facing of resilient spokes between rim and hub and surrounding the hub with a restricting-collar, and between said collar and rim a double facing of straight rigid spokes holding the collar in tension, the resilient spokes being flexible and the straight rigid spokes inflexible, the hub, as supported centrally, having freedom of movement within the collar, according to the flexibility and resiliency of the resilient spokes, restricted as to any liability to excess of motion by the collar, which is supported and held by the rigid straight spokes, the collar located, as regards nearness to the hub, within the outer limit of the exterior flanges of the hub, but not in direct contact therewith, space being afforded between its interior face and the spindle portion of the hub, leaving the hub free to move out of center as affected by the weight carried and the shock received. This collar is essential to the lateral rigidity of the wheel, being braced from each end.

The object of this invention is to do away with pneumatic tires, which readily become injured by the puncturing, cutting, &c., caused by glass, tacks, sharp stones, and the like, and also to provide an easy yet restricted spring motion more conducive to the comfort of the rider and the safety and longevity of the vehicle.

It has for a further object the prevention of harsh, jarring, and rattling sound, as caused by the solid wheels of carriages, carts, trucks, and other vehicles in rolling over the pavement.

Figure 1:
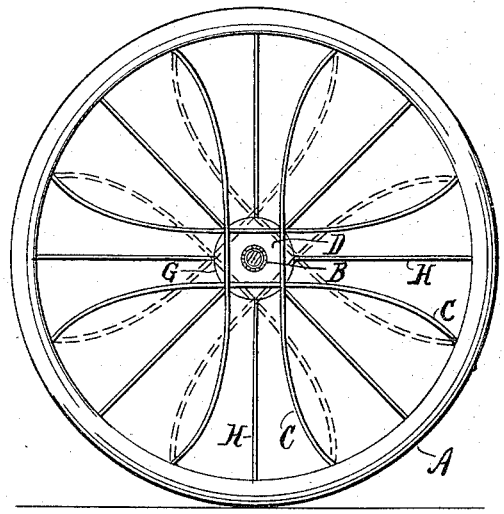
Figure 2:
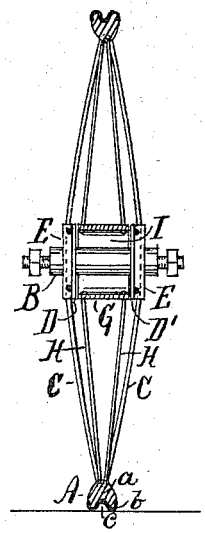
Figure 3:
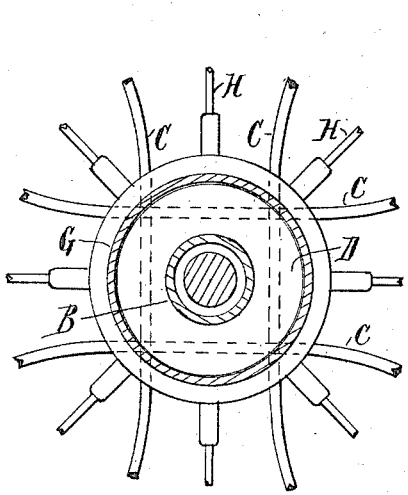
Figure 4:
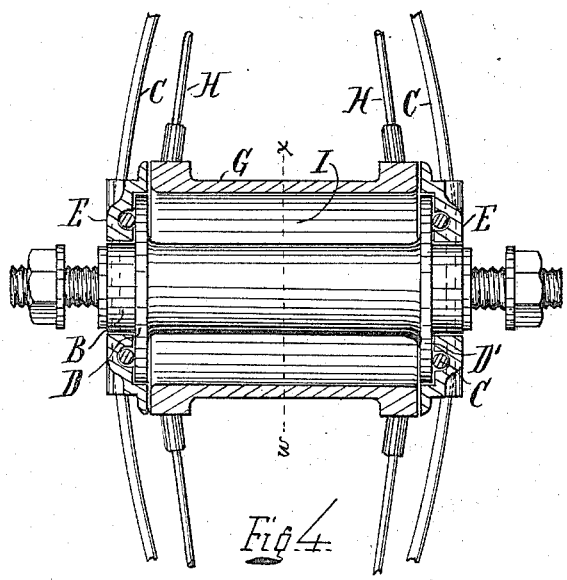

In the drawings accompanying, Figure 1 represents a side elevation of the wheel complete, with the resilient spokes of the opposite or reverse face shown by dotted lines. Fig. 2 represents a vertical cross-section of the same. Fig. 3 represents a cross-section of the hub enlarged to about three-fourths full size. Fig. 4 represents a face view of the hub as across the wheel, with the collar in section, also the resilient spokes and securing-plates therefor.

On the drawings, A indicates the tire or rim of the wheel, and B the hub.

C indicates curved, flexible, and resilient spokes secured to the rim, tire, or other suitable border and also secured to the hub, each face of the wheel having its own set, so that the wheel is double-faced, as shown in Fig. 1, wherein the spokes of the reverse face are represented by dotted lines. The spokes of the two faces converge, as shown sectionally in Fig. 2, from hub toward the rim or border. I do not confine myself strictly to the arrangement of these spokes C, as shown in Fig. 1, with regard to each other or to the exact number there shown, as variations may be made without affecting the improvement herein.

The hub B is provided with two flanges D and D', and against the said flanges the spokes C rest, being held in place by a covering-plate or face-ring E at each side of the wheel. The inside face of each plate E is grooved to enable it to cover and secure the spokes, and plate E is secured to the hub by rivets, bolts, keys, or the like, to turn therewith.

The covering or clutch plates E, having their back face grooved, cover the resilient spokes C at their respective sides of the wheel, holding the spokes against the hub-flanges, but not rigidly, as the spokes are not fastened, but have a permissible motion in the direction of their length only, being restricted merely as to motion in other directions.

Between the flanges D and D' within the wheel is arranged a collar G, held rigidly in place by straight rigid spokes H, which radiate therefrom and sectionally converge toward the rim or border, as shown in Fig. 2.

The spokes H hold the collar G in tension, rigidly supporting and sustaining it, and as the collar G is not in contact with any part of the hub B the hub is free to move out of center within its inclosure as the resilient spokes C "give" under the weight carried or shock received, but as the collar G fits loosely within the space between the flanges D and D' of the hub, allowing free movement vertically, it is limited as to any lateral motion or swing entirely.

The space between collar and hub is indicated at I. The degree of space may be greater or lesser, as desired and according to the diameter of the collar. About half of an inch out of center would be usually sufficient movement for the hub. The space therefor should be somewhat more, generally, as it is not intended that the hub should strike the collar, except in the event of excess of movement from some unusual circumstance. Such excess of motion will bring the hub in contact with the collar and thus become speedily checked, the collar restricting and impeding it.

The converging of the spokes H, as shown in Fig. 2, in tension secures the whole central portion of the wheel from injury by cross-strains. Figs. 3 and 4 show the central portion of the wheel about three-fourths full size, the spokes connected are shown, the collar G and covering plates E in section.

In constructing the wheel I first make a rigid wheel by taking the collar or nave G and the rim A, uniting them by means of the rigid spokes H. I then pass the hub B through the collar G to its place, the collar being formed with sufficient diameter to admit thereof. I then apply the resilient spokes C, which are held to the flanges of the hub by the covering plates or clutches E and to the rim A at the various points of contact. The covering or clutch plates E are of sufficient diameter to cover at their outer edges the side or lateral edges of the collar G, so that when plates E are secured to the hub-flanges lateral movement of the collar G is prevented or of the hub with respect thereto, as the outer peripheral edge of plates E are specially formed and adapted to serve the purpose, as shown in Fig. 4.

In Fig. 2 is shown, sectionally, a novel rim which I prefer to use as a border for the wheel, although any rim may be used with the described systems of spokes, collar, and hub. This rim is composed of wood, sectionally pear-shaped, with a groove all around in the middle of its working face, with a layer of rubber or other elastic, flexible, or cushioning material. The wooden portion is indicated at a, the facing at b, and the groove at c. It will be seen that the rim meets the ground in two lines instead of one, as heretofore, rendering the wheel less liable to slip sidewise and giving a firmer grip upon the ground.

Hubs of other forms may be used with this invention, as I do not confine myself strictly to the shape shown. Any of the hubs and axles now used for bicycles are especially suitable.

What I claim as new, and desire to secure by Letters Patent, is—

1. In a wheel for bicycles and other vehicles, a hub held in position centrally by a double system of flexible and resilient spokes curving and radiating therefrom toward the rim of the wheel with a double system of rigid spokes rigidly holding a collar encircling the hub suitably distanced therefrom, but not attached thereto, serving as a restricting medium against excess of motion, or vibration of the hub, and also arranged with regard to the hub and within exterior flanges thereof to restrict the hub against any lateral motion or swing essentially as set forth.

2. A wheel for bicycles and other vehicles having its hub surrounded by an encircling collar, or supplemental nave, suitably distanced therefrom, the interior or main hub sustained flexibly and resiliently by a set or system of eight curved spokes at each end thereof, each set composed of four pieces of metal wire, the two sets constituting two faces of the wheel and comprising in all sixteen spokes, the supplemental nave sustained rigidly by a double system of straight rigid spokes and all constructed, arranged and combined essentially as set forth.

3. In a wheel for bicycles and other vehicles, the combination of the clutch-plates E, with the hub, the plate having its back face grooved to receive the spokes secured to the hub and covering the spokes as set forth.

4. In a wheel for bicycles and other vehicles, the combination of rim A, hub B, spokes C, covering or clutch plates E, collar, nave or restricting-ring G, and spokes H, all constructed, arranged and combined essentially as set forth.

5. In a wheel for bicycles and other vehicles, a double facing of metal spring-wire spokes consisting of four wires to each face held against the hub by a grooved covering-plate, each and every spoke-wire extending from the rim at one point to the rim at another point in one piece, curving as the arc of a circle and all sustaining the hub of the wheel flexibly and resiliently essentially as set forth.

GEO. HAYES.

Witnesses:
ARTHUR HAYES,
R. H. REILLÉ.